United States Patent
Peterson et al.

(10) Patent No.: US 10,752,237 B2
(45) Date of Patent: Aug. 25, 2020

(54) SYSTEM AND METHOD FOR AUTOMATICALLY LEVELING AN AGRICULTURAL IMPLEMENT

(71) Applicant: CNH Industrial America, LLC, New Holland, PA (US)

(72) Inventors: Klint J. Peterson, Mackinaw, IL (US); Christopher Barrick, Morton, IL (US); John C. Endsley, Washington, IL (US); James W. Henry, Saskatchewan (CA); Tracey D. Meiners, Mackinaw, IL (US)

(73) Assignee: CNH Industrial America LLC, New Holland, PA (US)

( * ) Notice: Subject to any disclaimer, the term of this patent is extended or adjusted under 35 U.S.C. 154(b) by 290 days.

(21) Appl. No.: 15/795,437

(22) Filed: Oct. 27, 2017

(65) Prior Publication Data

US 2019/0126912 A1    May 2, 2019

(51) Int. Cl.
*B60W 30/02*    (2012.01)
*B60D 1/46*    (2006.01)
(Continued)

(52) U.S. Cl.
CPC ............. *B60W 30/02* (2013.01); *A01B 59/04* (2013.01); *A01B 59/042* (2013.01); *A01B 63/16* (2013.01);
(Continued)

(58) Field of Classification Search
CPC ...... B60W 30/02; B60W 10/22; B60W 10/30; B60W 2300/15; B60W 2520/16;
(Continued)

(56) References Cited

U.S. PATENT DOCUMENTS

| | | | |
|---|---|---|---|
| 5,559,725 A | * | 9/1996 | Nielson ..................... E02F 3/16 37/348 |
| 6,220,366 B1 | | 4/2001 | Noonan et al. |

(Continued)

FOREIGN PATENT DOCUMENTS

| | | | | |
|---|---|---|---|---|
| EP | 1298021 A1 | * | 4/2003 | .......... B60T 8/17557 |
| JP | 10287262 A | * | 10/1998 | ............. G01B 21/22 |
| JP | 2005271846 A | * | 10/2005 | ............ B60T 8/1755 |

OTHER PUBLICATIONS

Harrow Case IH "True Tandem Disk Harrows" https://www.caseih.com Dated Mar. 21, 2017 (12 pages).

*Primary Examiner* — Tuan C To
(74) *Attorney, Agent, or Firm* — Rebecca L. Henkel; Rickard K. DeMille (57) ABSTRACT

A method for automatically leveling an agricultural implement being towed by a work vehicle includes monitoring a vehicle inclination angle via at least one vehicle-based sensor supported on the work vehicle, monitoring an implement inclination angle via at least one implement-based sensor supported on the implement, and determining that the work vehicle has begun to travel across an inclined surface based on the vehicle inclination angle. The method further includes initially adjusting a position of a hitch of the work vehicle in a first direction to maintain the implement inclination angle within a predetermined angular inclination range as the vehicle travels across the inclined surface and adjusting the position of the hitch in a second direction opposite the first direction to maintain the implement inclination angle within the predetermined angular inclination range.

18 Claims, 5 Drawing Sheets

(51) Int. Cl.
  *B60G 17/019*   (2006.01)
  *B60G 17/0165*  (2006.01)
  *B60G 17/0195*  (2006.01)
  *B60W 10/30*    (2006.01)
  *B60W 10/22*    (2006.01)
  *A01B 59/04*    (2006.01)
  *A01B 63/14*    (2006.01)
  *A01B 63/16*    (2006.01)
  *A01B 63/22*    (2006.01)
  *A01B 59/042*   (2006.01)
  *B60D 1/00*     (2006.01)

(52) U.S. Cl.
  CPC ............... *A01B 63/22* (2013.01); *B60D 1/46* (2013.01); *B60G 17/0165* (2013.01); *B60G 17/0195* (2013.01); *B60G 17/01908* (2013.01); *B60W 10/22* (2013.01); *B60W 10/30* (2013.01); *A01B 63/14* (2013.01); *B60D 2001/008* (2013.01); *B60W 2300/15* (2013.01); *B60W 2520/16* (2013.01); *B60W 2520/18* (2013.01); *B60W 2710/22* (2013.01); *B60W 2710/30* (2013.01)

(58) Field of Classification Search
  CPC .... B60W 2520/18; A01B 59/04; A01B 63/16; A01B 63/14; B60D 1/146; B60D 2001/008; B60G 17/0165; B60G 17/01908; B60G 17/0195
  USPC .......................................................... 701/37
  See application file for complete search history.

(56) References Cited

U.S. PATENT DOCUMENTS

| | | | | |
|---|---|---|---|---|
| 6,609,315 B1 | * | 8/2003 | Hendron | E02F 3/28 |
| | | | | 37/348 |
| 6,694,260 B1 | | 2/2004 | Rekow | |
| 6,834,223 B2 | | 12/2004 | Strelioff et al. | |
| 7,063,167 B1 | | 6/2006 | Staszak et al. | |
| 8,082,084 B2 | * | 12/2011 | Nichols | E02F 3/3414 |
| | | | | 37/438 |
| 8,141,650 B2 | * | 3/2012 | Breiner | E02F 3/845 |
| | | | | 172/4.5 |
| 8,857,530 B2 | | 10/2014 | Henry | |
| 9,155,240 B2 | * | 10/2015 | Redekop | A01B 73/044 |
| 9,204,626 B2 | | 12/2015 | Vitali et al. | |
| 9,409,459 B2 | | 8/2016 | Solbrack et al. | |
| 9,572,296 B2 | | 2/2017 | Henry et al. | |
| 10,066,367 B1 | * | 9/2018 | Wang | E02F 9/2029 |
| 2002/0134558 A1 | * | 9/2002 | Bernhardt | A01B 69/004 |
| | | | | 172/7 |
| 2002/0157841 A1 | * | 10/2002 | Bernhardt | A01B 15/14 |
| | | | | 172/7 |
| 2005/0087378 A1 | * | 4/2005 | Hrazdera | B60C 23/00 |
| | | | | 180/170 |
| 2006/0254268 A1 | * | 11/2006 | Yasuda | F16H 61/40 |
| | | | | 60/435 |
| 2010/0017070 A1 | * | 1/2010 | Doering | B60W 30/02 |
| | | | | 701/48 |
| 2010/0140009 A1 | * | 6/2010 | Kamen | B60L 15/2036 |
| | | | | 180/282 |
| 2010/0219004 A1 | * | 9/2010 | Mackenzie | B62D 55/125 |
| | | | | 180/9.21 |
| 2011/0270509 A1 | * | 11/2011 | Whitney | F02D 13/0219 |
| | | | | 701/103 |
| 2012/0065860 A1 | * | 3/2012 | Isaji | B60T 13/52 |
| | | | | 701/70 |
| 2012/0201640 A1 | * | 8/2012 | Jessen | E02F 3/434 |
| | | | | 414/694 |
| 2014/0000919 A1 | | 1/2014 | Bachman et al. | |
| 2015/0156948 A1 | | 6/2015 | Henry | |
| 2015/0156950 A1 | | 6/2015 | Henry | |
| 2016/0029543 A1 | * | 2/2016 | Stich | A01B 59/043 |
| | | | | 701/50 |
| 2016/0057921 A1 | * | 3/2016 | Pickett | A01B 69/008 |
| | | | | 701/41 |
| 2016/0097658 A1 | * | 4/2016 | Friend | G01B 11/24 |
| | | | | 250/227.16 |
| 2016/0135356 A1 | | 5/2016 | Prickel et al. | |
| 2016/0330948 A1 | | 11/2016 | Schnaider et al. | |
| 2016/0338257 A1 | | 11/2016 | Sauder et al. | |
| 2017/0006761 A1 | | 1/2017 | Anderson et al. | |
| 2017/0118901 A1 | | 5/2017 | Stark | |
| 2017/0360357 A1 | * | 12/2017 | Larson | G16H 20/40 |
| 2018/0004230 A1 | * | 1/2018 | Leonard | G05D 1/0891 |

* cited by examiner

SYSTEM AND METHOD FOR AUTOMATICALLY LEVELING AN AGRICULTURAL IMPLEMENT

FIELD OF THE INVENTION

The present subject matter relates generally to leveling systems for agricultural implements and, more particularly, to a system and method for automatically leveling an agricultural implement using sensor feedback from a combination of vehicle-based and implement-based level sensors.

BACKGROUND OF THE INVENTION

In the continuing quest for providing greater efficiency in the operation of agricultural implements, machines have been constructed to have ever increasing lateral spans relative to a tractor or other work vehicle propelling the implement over a field. When the span increases to realize greater efficiency and speed, the criteria of having uniform and level tool contact with the soil becomes quite important. Equipment with a significant lateral span typically has many different joints and is usually articulated to enable transport to and between fields. In this regard, an area of special importance to level positioning of agricultural implements is found in the tillage field. In particular, for tillage applications, the desirable outcome is a uniform physical depth of the tillage and a uniform entry of the disc blades or other ground-engaging tools into the soil.

To date, systems have been developed for monitoring and adjusting the angular inclination of an implement. For example, U.S. Pat. No. 9,609,800 (Henry), filed on Dec. 10, 2014, discloses a remote leveling system that utilizes sensor feedback from inclinometers mounted on an implement to control hydraulic actuators on the implement for adjusting the inclination of the implement. While this leveling system provides numerous advantages over conventional leveling systems, improvements and advances are still desired for further enhancing the accuracy and effectiveness of monitoring and controlling the level positioning of an implement.

Accordingly, an improved system and method for automatically leveling an agricultural implement being towed by a work vehicle that utilizes sensor feedback from a combination of sources to enhance the accuracy and/or effectiveness of the implement leveling would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for automatically leveling an agricultural implement being towed by a work vehicle. The method may generally include monitoring, with a computing device, a vehicle inclination angle via at least one vehicle-based sensor supported on the work vehicle, monitoring, with the computing device, an implement inclination angle via at least one implement-based sensor supported on the implement, and determining, with the computing device, that the work vehicle has begun to travel across an inclined surface based on the vehicle inclination angle. Additionally, the method may include initially adjusting, with the computing device, a position of a hitch of the work vehicle in a first direction to maintain the implement inclination angle within a predetermined angular inclination range as the work vehicle travels across the inclined surface and adjusting, with the computing device, the position of the hitch in a second direction opposite the first direction to maintain the implement inclination angle within the predetermined angular inclination range as at least one ground-engaging component of the implement travels across the inclined surface.

In another aspect, the present subject matter is directed to a system for automatically leveling an agricultural implement being towed by a work vehicle. The system may include a vehicle-based sensor configured to detect a vehicle inclination angle of the work vehicle, an implement-based sensor configured to detect an implement inclination angle of the implement, and at least one controller communicatively coupled to the vehicle-based sensor and the implement-based sensor. The controller(s) may include a processor and associated memory. The memory may store instructions that, when executed by the processor, configure the controller(s) to monitor the vehicle inclination angle based on sensor data received from the vehicle-based sensor, monitor the implement inclination angle based on sensor data received from the implement-based sensor, and determine that the work vehicle has begun to travel across an inclined surface based on the vehicle inclination angle. In addition, the controller(s) may be configured to initially adjust a position of a hitch of the work vehicle in a first direction to maintain the implement inclination angle within a predetermined angular inclination range as the work vehicle travels across the inclined surface. Moreover, the controller(s) may be configured to adjust the position of the hitch in a second direction opposite the first direction to maintain the implement inclination angle within the predetermined angular inclination range as at least one ground-engaging component of the implement travels across the inclined surface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for automatically leveling an agricultural implement being towed by a work vehicle. Specifically, in several embodiments, one or more implement-based level sensors may be installed on the implement while one or more vehicle-based level sensors may be installed on the work vehicle. In such embodiments, a controller(s) of the disclosed system may be configured to monitor one or more angles of inclination of both the implement and the work vehicle based on the sensor feedback received from the level sensors. Thereafter, based on the feedback from the sensors, the controller(s) may be configured to control one or more actuators located on the work vehicle and/or the implement so as to maintain the inclination angle(s) of the implement within a desired angular inclination range (e.g., an angular range defined relative to a reference plane extending perpendicular to the soil surface, such as an angular range of +/−5 degrees from the reference plane).

In particular embodiments of the present subject matter, by monitoring the inclination angle(s) of the work vehicle, the system controller(s) may detect changes in the vehicle's inclination angle(s) that are indicative of the vehicle beginning to travel up or down an inclined surface. When it is detected that the vehicle has begun to travel across an inclined surface, the controller(s) may be configured to immediately execute one or more control actions for maintaining the desired inclination angle(s) for the implement, such as by adjusting the position of the vehicle's hitch. As a result, the system responsiveness for maintaining the implement at a level orientation may be increased significantly. Moreover, the detection of such changes in the inclination angle(s) of the work vehicle may also serve as a trigger to the controller(s) that the trailing implement will soon be traveling across the inclined surface. Thus, based on whether the work vehicle is traveling up or down the inclined surface, the controller(s) may proactively determine the appropriate control action(s) for maintaining the implement at a level orientation as the implement begins to transition to the inclined surface.

Figure 1:
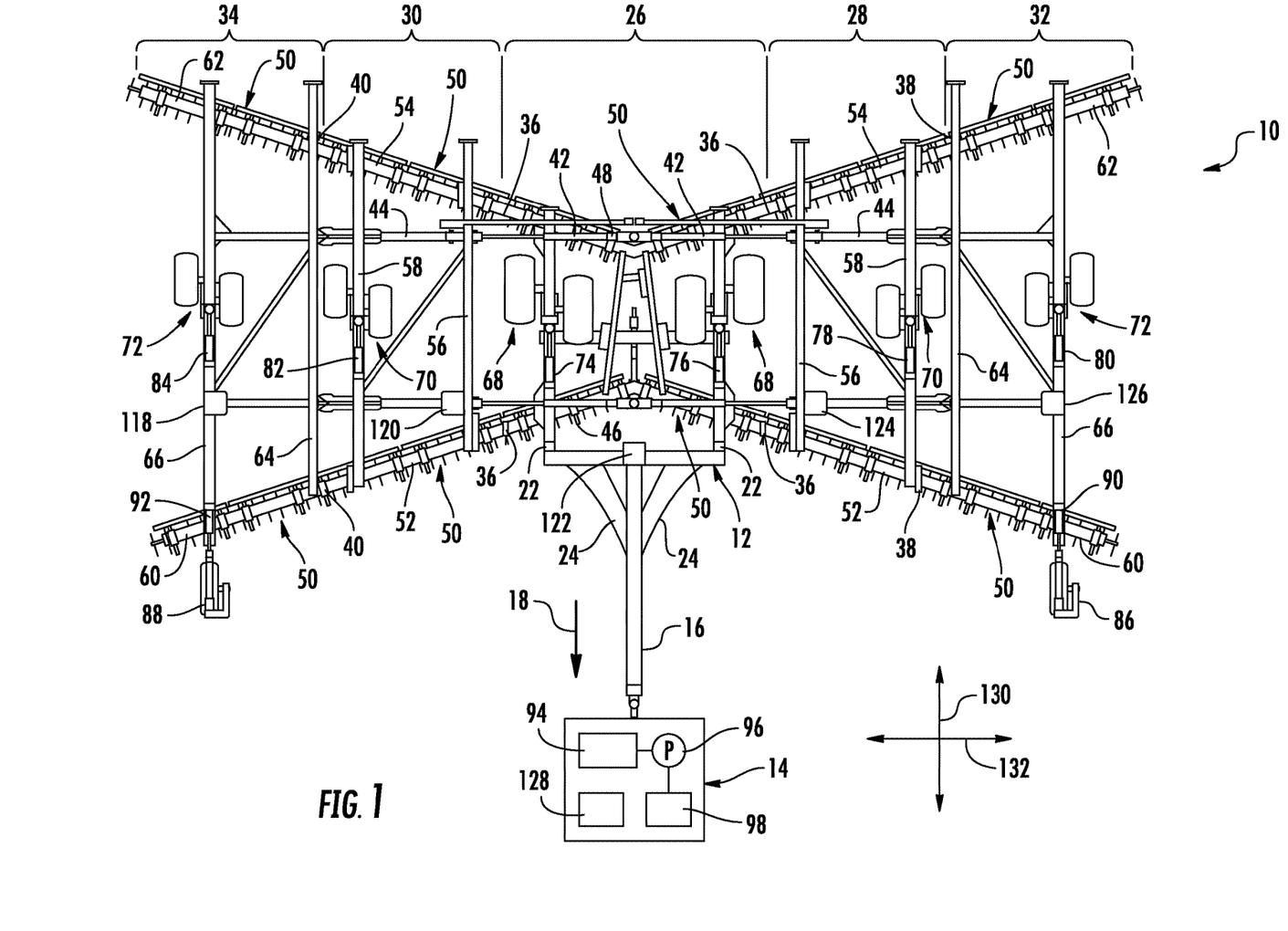
FIG. 1 illustrates a top view of one embodiment of an agricultural implement in accordance with aspects of the present subject matter.

Referring now to FIG. 1, a top view of one embodiment of a multi-section implement 10 is illustrated in accordance with aspects of the present subject matter. As shown, the implement 10 is configured as a multi-section disc ripper. However, in other embodiments, the implement 10 may have any other suitable implement configuration, such as by being configured as any other suitable multi-section implement, including any other suitable tillage implement (e.g., a cultivator) or other implement (e.g., a planter, seeder, sprayer, fertilizer, and/or the like).

As shown, the implement 10 includes a carriage frame assembly 12 configured to be towed by a traction unit, such as a work vehicle (shown schematically in FIG. 1 as box 14). The carriage frame assembly 12 may generally include a pull hitch 16 extending in a forward travel direction 18 of the implement 10, and forward and aft oriented carrier frame members 22 which are coupled with and extend from the pull hitch 18. Additionally, reinforcing gusset plates 24 may be used to strengthen the connection between the pull hitch 18 and the carrier frame members 22.

As shown in FIG. 1, the tillage implement 10 is configured as a multi-section implement including a plurality of frame sections. Specifically, in the illustrated embodiment, the tillage implement 10 includes a center frame section 26, inner right and left wing frame sections 28, 30 pivotally coupled to the center frame section 26, and outer right and left wing frame sections 32, 34 pivotally coupled to the inner wing sections 28, 30. For example, the center section 26 is pivotally coupled to the inner wing sections 28, 30 at pivot joints 36. Similarly, the inner right wing section 28 is pivotally coupled to the outer right wing section 32 at pivot joints 38 while the inner left wing section 30 is pivotally coupled to the outer left wing section 34 at pivot joints 40. As is generally understood, the pivot joints 36, 38, 40 may be configured to allow relative pivotal motion between adjacent frame sections of the implement 10. For example, the pivot joints 36, 38, 40 may allow for articulation of the various frame sections between a field position, in which the frame sections are all disposed substantially in a common plane, and a transport position, in which the wing sections 28, 30, 32, 34 are folded upwardly to reduce the overall width of the implement 10.

Additionally, as shown in FIG. 1, the implement 10 may include inner wing actuator assemblies 42 coupled between the center frame section 26 and the inner wing sections 28, 30 to enable pivoting between the field and transport positions. For example, by retracting/extending the inner wing actuators 42, the inner wing sections 28, 30 may be pivoted relative to the center frame section 26 about the pivot joints 36. Moreover, the implement 10 may also include outer wing actuator assemblies 44 coupled between each inner wing section 28, 30 and its adjacent outer wing section 32, 34. As such, by retracting/extending the outer wing actuators 44, each outer wing section 32, 34 may be pivoted relative to its respective inner wing section 28, 30.

Moreover, each of the frame sections may include one or more frame members for supporting one or more ground-engaging tools. For instance, the center frame section 26 includes a forward frame member 46 coupled to the carrier frame 22 at its front end and an aft frame member 48 coupled to the carrier frame 22 at its aft end. Additionally, each inner wing section 28, 30 includes a forward frame member 52 and an aft frame member 54, with such frame members 52, 54 being interconnected by forward and aft oriented inner and outer frame members 56, 58. In one embodiment, the forward and aft frame members 52, 54 of the inner wing sections 28, 30 may generally form an extension of the forward and aft frame members 46, 48 of the center frame section 26. Similarly, each outer wing section 32, 34 includes forward and aft frame members 60, 62, with such frame members being interconnected by inner and outer frame members 64, 66.

In the illustrated embodiment, each of the frame members 46, 48, 52, 54, 60, 62 is configured to support one or more gangs of disc blades 50. In such an embodiment, the gangs of disc blades 50 may be resiliently connected to the frame members 46, 48, 52, 54, 60, 62 in any suitable manner so as to provide smooth working of the soil. However, it should be appreciated that, in other embodiments, any other suitable ground-engaging tools may be supported by the various frame members, such as shanks, tines, rolling baskets, and/or the like.

In several embodiments, the various frame sections 26, 28, 30, 32, 34 of the tillage implement 10 may be configured to be positioned at variable positions relative to the soil in order to set the position of the gangs of disc blades 50 above the soil as well as the penetration depth of the disc blades 50. For example, in the illustrated embodiment, the tillage implement 10 includes center transport wheels 68 pivotally interconnected with the carrier frames 22 so that they provide support to the forward and aft frame members 46 and 48 relative to the soil. Similarly, inner wing transport wheels 70 may be interconnected with the frame elements 58 to support and variably position the inner wing sections 28, 30 relative to the soil. In addition, outer wing transport wheels 72 may be pivotally mounted on the frame members 66 to support and variably position the outer wing sections 32, 34 relative to the soil.

In such an embodiment, wheel actuators may also be provided in operative association with the various wheels to adjust the relative positioning between the frame sections and the soil. For instance, center wheel actuators 74, 76 may be utilized to manipulate the center transport wheels 68 to establish the distance of the center frame section 26 relative to the soil while inner wing wheel actuators 78, 82 may be used to variably position the inner wing sections 28, 30 relative to the soil. Similarly, outer wing wheel actuators 80, 84 may be used to variably position the outer wing sections 32, 34 relative to the soil.

It should be appreciated that the implement 10 may also include gauge wheels 86, 88 on the outer wing sections 32, 34 to orient the fore-to-aft angle of the tillage implement 10 relative to the soil. In such an embodiment, gauge wheel actuators 90, 92 may be provided in operative association with the gauge wheels 86, 88 to allow the fore-to-aft angle of the implement 10 to be adjusted. As shown in FIG. 1, in one embodiment, the gauge wheels 86, 88 may correspond to the forward-most ground-engaging components of the implement 10.

It should be also appreciated that, in several embodiments, the various actuators described above may correspond to hydraulically-activated actuators, such as hydraulic cylinders. In such embodiments, the flow of hydraulic fluid to the various actuators may be controlled, for example, via one or more valve assemblies 94 located on and/or within the work vehicle 14 configured to tow the implement 10. For instance, the work vehicle 14 may include a pump 96 configured to supply a flow of pressurized hydraulic fluid from a fluid supply 98 to the valve assembly(ies) 94. The valve assembly(ies) 94 may, in turn, be controlled so as to regulate the supply of hydraulic fluid to the various actuators on the implement 10. As will be described in greater detail below, the operation of the valve assembly(ies) 94 may be electronically controlled via one or more controllers of the disclosed system. An example of suitable hydraulic connections that may be made between the valve assembly(ies) 94 and the various actuators of the implement 10 are described, for example, in U.S. Pat. No. 9,609,800 (Henry), filed on Dec. 10, 2014, the disclosure of which is hereby incorporated by reference herein in its entirety for all purposes.

Referring still to FIG. 1, in several embodiments, the implement 10 may also include a plurality of implement-based sensors mounted to or supported on the various frame sections 26, 28, 30, 32, 34 for monitoring the relative orientation, levelness and/or inclination of the frame sections. For instance, as shown in FIG. 1, a first level sensor 118 may be coupled to the outer wing section 34, a second level sensor 120 may be coupled to the inner wing section 30, a third level sensor 122 may be coupled to the center frame section 26, a fourth level sensor 124 may be coupled to the inner wing section 28, and a fifth level sensor 126 may be coupled to the outer wing section 32. In such an embodiment, each level sensor 118, 120, 122, 124, 126, 128 may be configured to output a signal or measurement indicative of the angle of inclination or "inclination angle" of its respective frame section 26, 28, 30, 32, 34. Such output signals from the sensors may then be transmitted to the system controller(s) for subsequent processing, analysis, and/or storage. For instance, based on the sensor data received from the implement-based level sensors, the controller(s) may be configured to independently monitor the inclination angle of each frame section. In such an embodiment, the controller(s) may, for example, utilize the inclination angle of the center frame section 26 as a reference value for determining the relative levelness or inclination of the various wing sections 28, 30, 32, 34 (e.g., by comparing the inclination angle of each wing section 28, 30, 32, 34 to the inclination angle of the center frame section 26).

Additionally, as shown in FIG. 1, one or more vehicle-based level sensors 128 may also be mounted to or supported on the work vehicle 14 towing the implement 10 for monitoring the angle of inclination or "inclination angle" of the work vehicle 14. As will be described below, the inclination angle of the work vehicle 14 may be used to determine when the work vehicle 14 begins to travel up or down an inclined surface. Upon detection of travel along an inclined surface, a control action(s) may be performed to maintain the inclination angle(s) of the implement 10 within a given levelness or angular inclination range.

It should be appreciated that, in one embodiment, each level sensor 118, 120, 122, 124, 126, 128 may correspond to an inclinometer, such as a single axis inclinometer, a two-axis inclinometer, or a three-axis inclinometer. For instance, in one embodiment, each implement-based level sensor 118, 120, 122, 124, 126 may be configured to measure the fore-to-aft inclination (e.g., an implement pitch angle) of its respective frame section in a fore-to-aft or "pitching" direction (indicated by arrow 130) extending parallel to the travel direction 18 and/or the side-to-side inclination (e.g., an implement roll angle) of its respective frame section in a side-to-side or "rolling" direction (indicated by arrow 132) extending perpendicular to the travel direction 18. Similarly, in one embodiment, each vehicle-based level sensor 128 may be configured to measure the fore-to-aft inclination (e.g., a vehicle pitch angle) of the work vehicle 14 in the pitching direction 130 and/or the side-to-side inclination (e.g., a vehicle roll angle) of the work vehicle 14 in the rolling direction 132. In other embodiments, the level sensors 118, 120, 122, 124, 126, 128 may correspond to any other suitable sensor(s) or sensing device(s) that may provide an indication of the angle of inclination of the implement 10 and/or the work vehicle 14, such as gyroscopes, accelerometers, height sensors (e.g., radar or sonar sensors), and/or the like.

It should be appreciated that the configuration of the implement 10 described above and shown in FIG. 1 is provided only to place the present subject matter in an exemplary field of use. Thus, it should be appreciated that the present subject matter may be readily adaptable to any manner of implement configuration. For example, in an alternative embodiment, the implement 10 may only include a single wing section disposed along each side of the central frame section 26 or the implement 10 may include three or more wing sections disposed along each side of the central frame section 26. Similarly, in another embodiment, any other suitable type of ground-engaging tool (or any combination of ground-engaging tools) may be coupled to or otherwise supported by the various frame sections 26, 28, 30, 32, 34 of the implement 10, including discs, shanks, tines, baskets, and/or the like.

Figure 2:
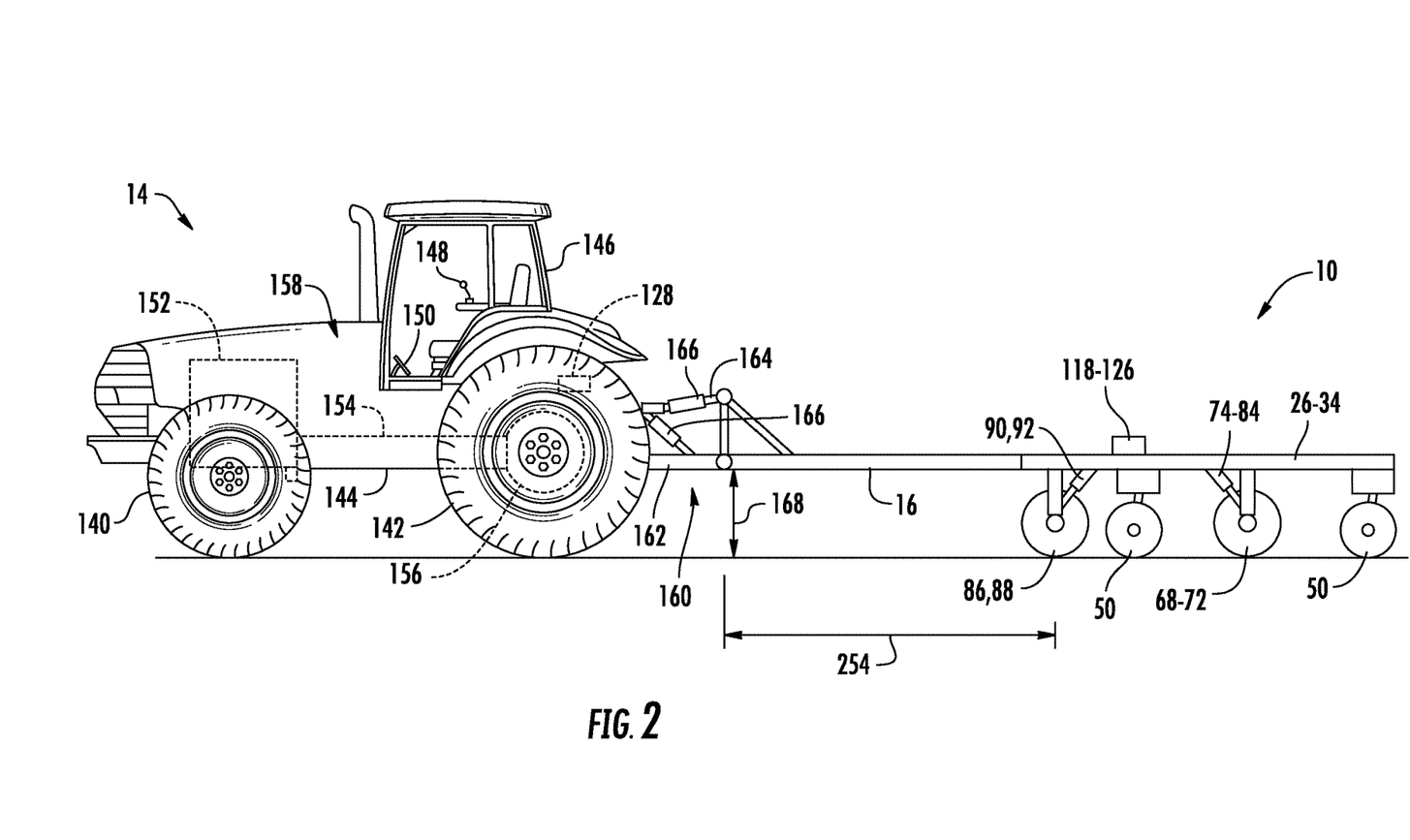
FIG. 2 illustrates a schematic side view of the implement shown in FIG. 1, particularly illustrating the implement being towed by one embodiment of a work vehicle in accordance with aspects of the present subject matter.

Referring now to FIG. 2, a schematic, side view of the implement 10 shown in FIG. 1 is illustrated in accordance with aspects of the present subject matter, particularly illustrating the implement 10 being towed by one embodiment of a work vehicle 14. As shown, the work vehicle 14 is configured as an agricultural tractor. However, in other embodiments, the work vehicle 14 may be configured as any other suitable work vehicle known in the art, such as any other suitable agricultural vehicle.

As shown in FIG. 2, the work vehicle 14 includes a pair of front wheels 140, a pair or rear wheels 142, and a chassis 144 coupled to and supported by the wheels 140, 142. An operator's cab 146 may be supported by a portion of the chassis 144 and may house various input devices, such as a control lever 148 and/or a foot pedal 150, for permitting an operator to control the operation of the work vehicle 14. Additionally, the work vehicle 14 may include an engine 152 and a transmission 154 mounted on the chassis 144. The transmission 154 may be operably coupled to the engine 152 and may provide variably adjusted gear ratios for transferring engine power to the wheels 142 via a drive axle assembly 156. The engine 152, transmission 154, and drive axle assembly 156 may collectively define a drive train 158 of the work vehicle 14.

Additionally, the work vehicle 14 may also include a hitch 160 for coupling the implement 10 to the vehicle 14. Specifically, in the illustrated embodiment, the pull hitch 16 of the implement 10 is coupled to the hitch 160 of the work vehicle 14 in a fully-mounted configuration. However, in other embodiments, the implement 10 may be coupled to the hitch 160 in any other suitable manner, such as in a semi-mounted configuration. As shown in the illustrated embodiment, the hitch 160 is configured as a three-point hitch and, thus, includes two lower hitch links 162 (one of which is shown) and an upper hitch link 164. However, in other embodiments, the hitch 160 may correspond to any other suitable type of hitch, such as a two-point hitch, a drawbar hitch, a scissor hitch, or any other suitable hitch type.

As shown in FIG. 2, the work vehicle 14 may also include one or more hitch actuators 166 provided in operative association with the hitch 160. In general, the hitch actuator(s) 166 may be configured to adjust the position of the hitch link(s) 160, 162 so as to vary a height 168 of the hitch 160 relative to the ground (referred to herein as the "hitch height 168"). By increasing/decreasing the hitch height 168 via adjustments made to the position of the hitch link(s) 162, 164, the inclination angle of the implement 10 may, in turn, be varied. For instance, increasing or decreasing the hitch height 168 may result in a corresponding adjustment in the pitch angle of the implement 10. It should be appreciated that the hitch actuator(s) 166 may, in one embodiment, correspond to hydraulically-activated actuators, such as hydraulic cylinders. Thus, similar to the various implement-based actuators described above, the supply of hydraulic fluid to the hitch actuators 166 may be regulated via a valve assembly located onboard the work vehicle 14 (e.g., the valve assembly(ies) 94 shown in FIG. 1).

As indicated above, the implement 10 is shown in FIG. 2 as being secured to the hitch 160 in a fully mounted configuration. As such, the pull hitch 16 of the implement 10 is coupled to both the lower hitch links 162 and the upper hitch link 164. In such an embodiment, extending or contracting the hitch actuators 166 may change the position of the links 162, 164 relative to the ground, thereby adjusting the hitch height 168 and the associated inclination angle of the implement 10. However, as indicated above, in another embodiment, the implement 10 may be secured to the hitch 160 in a semi-mounted configuration in which the pull hitch 16 is only coupled to the lower hitch links 162 of the hitch 160. In such an embodiment, the position of the lower hitch links 162 may be adjusted via the corresponding hitch actuator(s) 166 to vary the hitch height 168. Of course, in embodiments in which the hitch 160 is not configured as a three-point hitch, the implement 10 may be coupled to the work vehicle 14 via any other mounting configuration suitable for use with the relevant hitch type.

It should be appreciated that, as indicated above, the inclination angle(s) of the implement 10 may also be adjusted by varying the position of one or more of the wheels of the implement 10. For instance, the transport wheel actuators 74-84 and/or the gauge wheel actuators 90, 92 may be extended/retracted to adjust the position of the transport wheels 68-72 and/or the gauge wheels 86, 86, respectively, relative to the adjacent frame sections 26-34 of the implement 10, thereby adjusting the inclination angle(s) of the implement 10 in one or more directions (e.g., in the pitching direction and/or the rolling direction).

It should also be appreciated that the configuration of the work vehicle 14 described above and shown in FIG. 2 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine 152, transmission 154, and drive axle assembly 156 are coupled, a configuration common in smaller tractors. Still other configurations may use an articulated chassis to steer the work vehicle 14, or rely on tracks in lieu of the wheels 140, 142.

Figure 3:
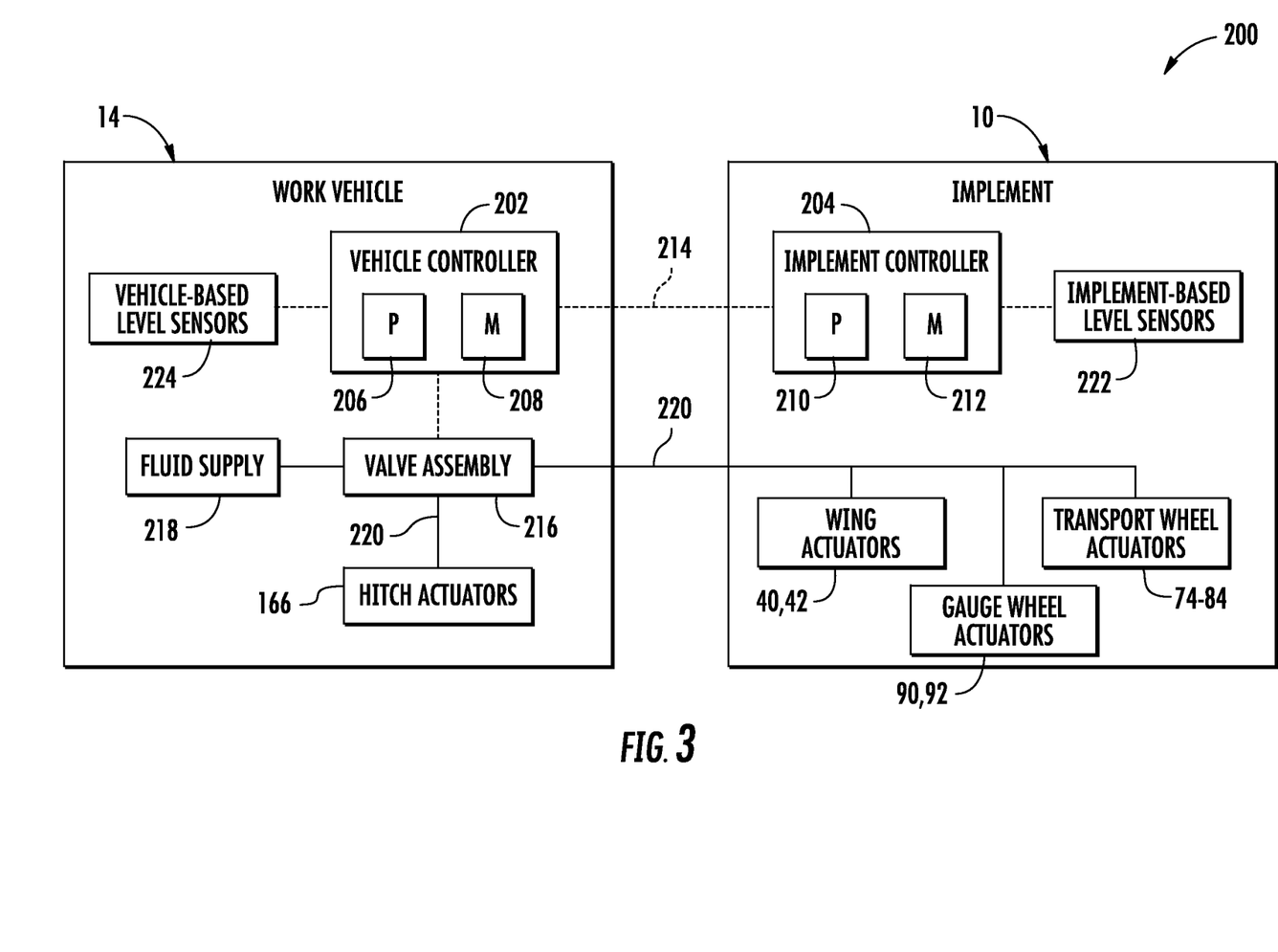
FIG. 3 illustrates a schematic view of one embodiment of a system for automatically leveling an agricultural implement being towed by a work vehicle in accordance with aspects of the present subject matter.

Referring now to FIG. 3, a schematic view of one embodiment of a system 200 for automatically leveling an agricultural implement being towed by a work vehicle is illustrated in accordance with aspects of the present subject matter. In general, the system 200 will be described herein with reference to the implement 10 and the work vehicle 14 described above and shown in FIGS. 1 and 2. However, it should be appreciated that the disclosed system 200 may generally be utilized with any suitable implement have any suitable implement configuration and/or with any suitable work vehicle having any suitable vehicle configuration. Additionally, it should be appreciated that hydraulic or fluid couplings of the system 200 shown in FIG. 3 are indicated by bold lines. Similarly, communicative links or electrical couplings of the system 200 shown in FIG. 3 are indicated by dashed lines.

As shown, the system 200 includes both a vehicle controller 202 installed on and/or otherwise provided in operative association with the work vehicle 14 and an implement controller 204 installed on and/or otherwise provided in operative association with the implement 10. In general, each controller 202, 204 of the disclosed system 200 may correspond to any suitable processor-based device(s), such as a computing device or any combination of computing devices. Thus, in several embodiments, the vehicle controller 202 may include one or more processor(s) 206 and associated memory device(s) 208 configured to perform a variety of computer-implemented functions, such as automatically controlling the operation of one or more components of the work vehicle 14. Similarly, as shown in FIG. 3, the implement controller 204 may also include one or more processor(s) 210 and associated memory devices 212 configured to perform a variety of computer-implemented functions, such as automatically controlling the operation of one or more components of the implement 10.

It should be appreciated that, as used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 208, 212 of the each controller 202, 204 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 208, 212 may generally be configured to store suitable computer-readable instructions that, when implemented by the processor(s) 206, 210 of each controller 202, 204, configure the controller 202, 204 to perform various computer-implemented functions, such as performing the various operations, control functions and/or control actions described herein and/or implementing one or more aspects of the method 300 described below with reference to FIG. 5.

In addition, each controller 202, 204 may also include various other suitable components, such as a communications circuit or module, a network interface, one or more input/output channels, a data/control bus and/or the like, to allow each controller 202, 204 to be communicatively coupled to the other controller and/or to any of the various other system components described herein (e.g., the various level sensors). For instance, as shown in FIG. 3, a communicative link or interface 214 (e.g., a data bus) may be provided between the vehicle controller 202 and the implement controller 204 to allow the controllers 202, 204 to communicate with each other via any suitable communications protocol. Specifically, in one embodiment, an ISOBus Class 3 (ISO11783) interface may be utilized to provide a standard communications protocol between the controllers 202, 204. Alternatively, a proprietary communications protocol may be utilized for communications between the vehicle controller 202 and the implement controller 204.

In one embodiment, the vehicle controller 202 may be communicatively coupled to one or more valve assemblies 216 (e.g., valve assembly(ies) 94 described above with reference to FIG. 1) to regulate the supply of hydraulic fluid from a fluid tank or supply 218 (e.g., fluid supply 98 described above with reference to FIG. 1) located on the work vehicle 14. Based on control signals from the vehicle controller 202 (which may be generated by the vehicle controller 202 or received from the implement controller 204), the valve assembly(ies) 216 may regulate the supply of hydraulic fluid from the fluid supply 218 to the various actuators of the work vehicle 14 (e.g., the hitch actuators 166) as well as the various actuators of the implement 10 (e.g., the wing actuators 42, 44, the transport wheel actuators 74-84, and the gauge wheel actuators 90, 92), such as by restricting or enabling fluid flow from the fluid supply 218 into the respective actuators via one or more hydraulic lines 220, which may run throughout the vehicle 14 and across to the implement 10. As fluid is supplied into each actuator, the pressure in the associated cylinder increases, causing the actuator to extend. Correspondingly, as fluid flows out of each actuator, the pressure in the corresponding cylinder decreases, causing the actuator to retract. Thus, by controlling the operation of the valve assembly(ies) 216, the vehicle controller 202 may control the extension/retraction of the various actuators, thereby allowing the controller 202 to automatically adjust the inclination angle of the implement 10. For instance, by controlling the extension/retraction of the hitch actuator(s) 166, the hitch height 168 may be adjusted, thereby allowing for a corresponding adjustment in the inclination angle of the implement 10. Similarly, by controlling the extension/retraction of one or more of the implement-based actuators 42, 44, 74-84, 90, 92, the associated frame section(s) of the implement 10 may be raised/lowered relative to the ground, thereby allowing the inclination angle of the implement 10 to be adjusted.

In one embodiment, the implement controller 204 may be configured to receive sensor data from one or more implement-based level sensors 222 (e.g., the level sensors 118-126 described above with reference to FIGS. 1 and 2) that is indicative of one or more inclination angles of the implement 10. For instance, in one embodiment, the implement controller 202 may be configured to monitor an overall inclination angle of the implement 10 based on the sensor data received from the implement-based level sensor(s) 222, such as an overall pitch angle or an overall roll angle for the implement 10. In such an embodiment, the implement controller 204 may be configured to compare the monitored inclination angle(s) to a predetermined angular inclination range(s) for the implement 10. In the event that the monitored inclination angle(s) falls outside of the desired angular inclination range, the controller 204 may be configured to transmit suitable control signals instructing the vehicle controller 202 to control the operation of the valve assembly(ies) 216 in a manner so as to bring the monitored inclination angle(s) back into the desired inclination angle range(s). For instance, if the monitored pitch angle of the implement 10 falls outside a corresponding pitch angle range set for the implement 10, the implement controller 204 may be configured to instruct the vehicle controller 202 to control the operation of the valve assembly(ies) 216 so as to extend/retract the hitch actuator(s) 166 and/or one or more of the wheel actuators 74-84, 90, 92 to adjust the implement pitch angle back into the desired range. Similarly, if the monitored roll angle of the implement 10 falls outside a corresponding roll angle range set for the implement 10, the implement controller 204 may be configured to instruct the vehicle controller 202 to control the operation of the valve assembly(ies) 216 so as to extend/retract one or more of the wheel actuators 74-84, 90, 92 and/or one or more of the wing actuators 42, 44 to adjust the implement roll angle back into the desired range, such as by raising the wing transport wheels 70, 72 and/or the gauge wheel 90, 92 relative to the wing sections disposed along one side of the center frame section 26 and/or by lowering the wing transport wheels 70, 72 and/or the gauge wheel 90, 92 disposed along the other side of the center frame section 26.

In other embodiments, the implement controller 204 may be configured to monitor the relative levelness or inclination angles of the various frame sections of the implement 10 based on the sensor data received from the implement-based level sensors 222. For instance, the implement controller 204 may be configured to compare the monitored inclination angle(s) for the center frame section 26 to the monitored inclination angles for the various wing sections 28, 30, 32, 34. In such an embodiment, if the inclination angle(s) for one or more of the wing sections 28, 30, 32, 34 differs from the inclination angle(s) of the center frame section 26 by a given differential threshold, the implement controller 204 may be configured to transmit suitable control signals instructing the vehicle controller 202 to control the operation of the valve assembly(ies) 216 so as to cause such wing section(s) to be pivoted relative to the center frame section 26, such as by raising or lowering the transport wheels 70, 72 and/or the gauge wheel(s) 90, 92 associated with such wing section(s) in order to cause the wing section(s) to be pivoted upward or downward at its associated pivot joint(s). As another example, the implement controller 204 may be configured to compare the monitored inclination angle of each frame section to a predetermined angular inclination range set for such frame section (or for the implement 10 in general). In such an embodiment, if the monitored inclination angle for a given frame section falls outside the desired inclination range, the implement controller 204 may be configured to transmit suitable control signals instructing the vehicle controller 202 to control the operation of the valve assembly(ies) 216 in a manner that brings the monitored inclination angle back into the desired inclination range, such as by raising or lowering the transport wheels 70, 72 and/or the gauge wheel(s) 90, 92 associated with the relevant frame section.

It should be appreciated that, although the above-described control functions and/or actions were generally described as being initiated by the implement controller 204 (and executed by the vehicle controller 202), such control functions/actions may, instead, be initiated by the vehicle controller 202. For instance, in another embodiment, the sensor data from the implement-based level sensors 222 may be passed through the implement controller 204 to the vehicle controller 202. In such an embodiment, the vehicle controller 202 may be configured to analyze the sensor data and generate suitable control signals for controlling the operation of the valve assembly(ies) 216 based on its analysis of the sensor data.

Additionally, in several embodiments, the levelness or inclination angle(s) of the implement 10 may be controlled or adjusted based at least in part on sensor data received from one or more vehicle-based level sensor(s) 224 (e.g., the level sensor(s) 128 described above with reference to FIGS. 1 and 2). For example, as indicated above, the vehicle-based level sensor(s) 224 may be configured to provide data indicative of the current inclination angle(s) of the work vehicle 14, such as a current pitch angle and/or a current roll angle of the work vehicle 14. As a result, the sensor data received from the vehicle-based level sensor(s) 224 may be utilized to determine when the work vehicle 14 encounters or begins to travel across an inclined surface (e.g., an upwardly inclined surface or a downwardly inclined surface). When it is determined that the work vehicle 14 has begun to travel across an inclined surface, the operation of the valve assembly(ies) 216 may be controlled so as to regulate the extension/retraction of one or more of the vehicle-based and/or implement-based actuators so as to maintain the inclination angle(s) of the implement 10 within a desired angular inclination range(s). Specifically, in several embodiments, the extension/retraction of the hitch actuator(s) 166 may be controlled in order to adjust the hitch height 168 in a manner that maintains the inclination angle(s) of the implement 10 within the desired angular inclination range(s) as the work vehicle 14 travels across the inclined surface.

It should be appreciated that, by detecting when the work vehicle 14 has begun to travel across an inclined surface, the controller(s) 202, 204 may be configured to immediately execute one or more control actions for maintaining the desired inclination angle(s) for the implement 14. As a result, the system responsiveness for maintaining the implement at a level orientation may be increased significantly. Moreover, the detection of such changes in the inclination angle(s) of the work vehicle 14 may also serve as a trigger to the controller(s) 202, 204 that the trailing implement will soon be traveling across the inclined surface. Thus, based on the detected change in the inclination angle(s) of the work vehicle 14, the controller(s) 202, 204 may proactively determine the appropriate control action(s) for maintaining the implement 10 at a level orientation as the implement 10 begins to transition to the inclined surface. For instance, the control action(s) may be selected based on a determination of whether the work vehicle 14 is traveling up or down the inclined surface. In addition, the control action(s) may be selected based on a determination of whether the work vehicle 14 is traveling up/down the inclined surface at an angle (e.g., due to detected changes in the roll angle of the work vehicle 14).

In one embodiment, the vehicle controller 202 may be configured to initially adjust the position of the hitch 160 in one direction as the work vehicle 14 begins to travel across an inclined surface (but prior to the implement traveling across such inclined surface) to vary the hitch height 168 in a manner that maintains the inclination angle(s) of the implement 10 within the desired angular inclination range(s). However, as the ground-engaging components of the trailing implement 10 subsequently begin to traverse across the inclined surface, the position of the hitch 160 may be adjusted in the opposite direction to ensure that the inclination angle(s) of the implement 10 is maintained within the desired inclination range(s). As will be described below, the positions of one or more of the wheels supported on the implement 10 (e.g., the gauge wheels 90, 92) may also be adjusted in combination with the hitch position control in order to maintain the inclination angle(s) of the implement 10 within the desired angular inclination range(s), such as during the time across which the ground-engaging components of the implement 10 begin to contact and travel up/down the inclined surface.

Figure 4A:
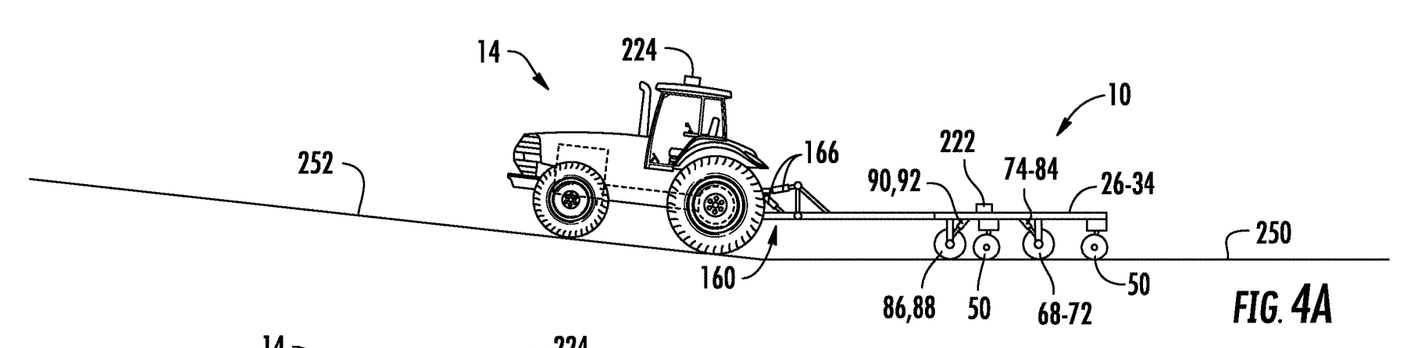
FIGS. 4A-4C illustrates a series of views in which a work vehicle and an implement are transitioning from a level surface to an upwardly inclined surface as the implement is being towed by the work vehicle in accordance with aspects of the present subject matter.
Figures 4B, 4C:
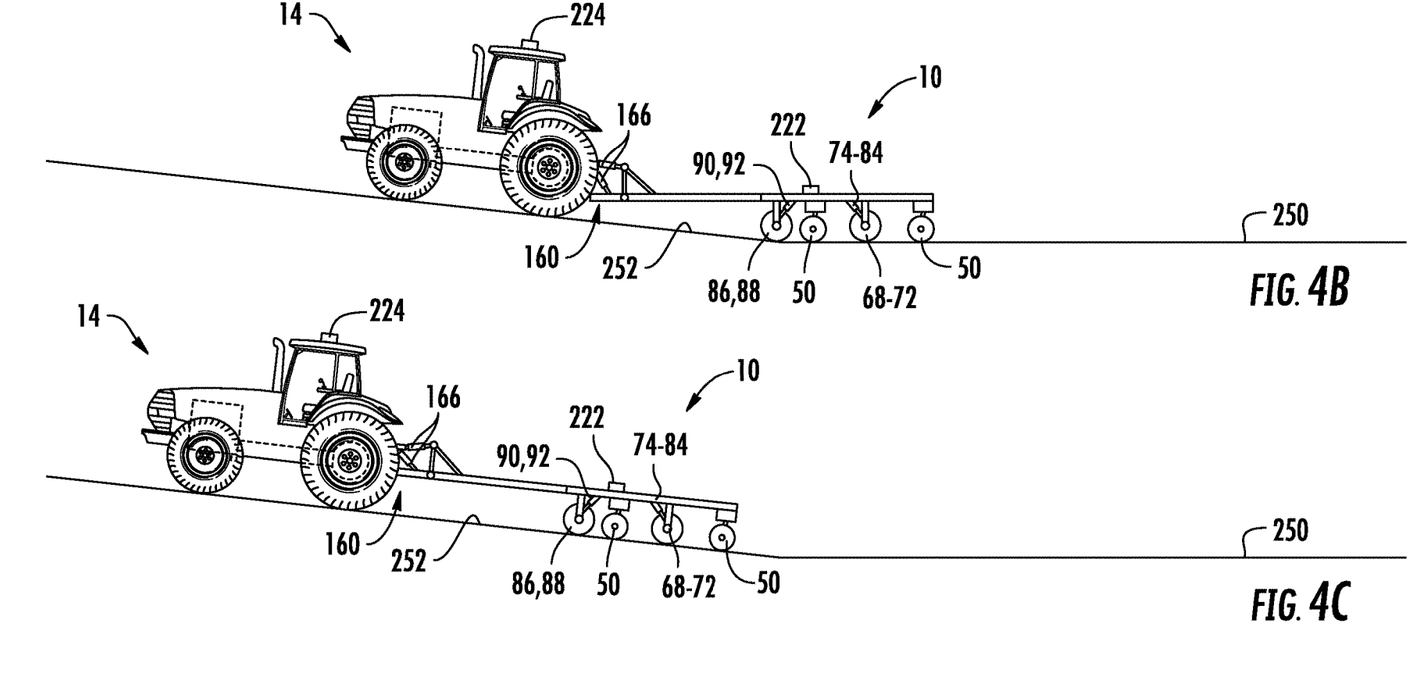

For example, FIGS. 4A-4C illustrate a series of views in which a work vehicle 14 and an implement 10 are transitioning from a level surface 250 to an upwardly inclined surface 252 as the implement 10 is being towed by the work vehicle 14. Specifically, FIG. 4A illustrates a side view of the vehicle/implement 14, 10 as the work vehicle 14 initially begins to travel up the inclined surface 252 while the implement 10 is still traveling along the level surface 250. FIG. 4B illustrates a subsequent side view of the vehicle/implement 14, 10 after the work vehicle 14 has moved further up the inclined surface 252 and just as the forward-most ground-engaging components of the implement 10 (e.g., the gauge wheels 86, 88) begin to contact the inclined surface 252. Additionally, FIG. 4C illustrates a side view of the vehicle/implement 14, 10 with both the work vehicle 14 and the implement 10 fully positioned on and traversing the inclined surface 252.

Referring initially to FIG. 4A, as the work vehicle 14 begins to travel up the inclined surface 252, the upward inclination of the vehicle 14 may be detected by the vehicle-based level sensor(s) (shown schematically in FIGS. 4A-4C as box 224) and communicated to the vehicle controller 202. In response to determining that the work vehicle 14 has begun to travel up the inclined surface 252, the vehicle controller 202 may be configured to control the operation of the hitch actuator(s) 166 such that the hitch 160 is moved downwardly in the direction of the inclined surface 252, thereby reducing the hitch height 168. As a result, the implement 10 may be maintained level as the work vehicle 14 travels up the inclined surface.

It should be appreciated that the actuation of the hitch 160 can be controlled in any suitable manner, including closed-loop control and/or open-loop control. For instance, in one embodiment, the vehicle controller 202 may be configured to execute a closed-loop control algorithm in which the hitch position is adjusted based on feedback received from the implement-based level sensor(s) (shown schematically in FIGS. 4A-4C as box 222). In such an embodiment, the hitch position may be adjusted downwardly based on the monitored inclination angle(s) of the implement 10 as the work vehicle 14 begins travel up the inclined surface 252. Alternatively, the vehicle controller 202 may be configured to implement an open-loop control algorithm in which the hitch position is adjusted based on the current ground speed of the work vehicle 10 and a hitch distance 254 (FIG. 2) defined between the hitch 160 and the forward-most ground-engaging component of the implement 10. In such an embodiment, the hitch position may be adjusted downwardly at a given rate determined as a function of the ground speed and the hitch distance 254.

Additionally, as shown in FIG. 4B, as the gauge wheels 86, 88 contact and begin to travel up the inclined surface 252, the upward inclination of the frame sections of the implement 10 may be detected by the implement-based level sensor(s) 222 and communicated to the vehicle controller 202. In response to determining that one or more of the ground-engaging components of the implement 10 have begun to travel up the inclined surface 252, the vehicle controller 202 may be configured to execute one or more control actions for maintaining the implement 10 within a desired angular inclination range. For instance, in one embodiment, the vehicle controller 202 may be configured to simultaneously control the operation of both the hitch actuator(s) 166 and the gauge wheel actuators 90, 92 to maintain the implement within the desired angular inclination range as the ground-engaging components begin to travel up the inclined surface 252. Specifically, the operation of the hitch actuator(s) 166 may be controlled such that the hitch 160 is moved upwardly in the direction away from the inclined surface 252, thereby increasing the hitch height 168. For instance, the position of the hitch 160 may be moved back towards the original position at which it was located prior to the work vehicle 10 beginning to travel up the inclined surface 252. Additionally, simultaneous with executing the hitch position control, the operation of the gauge wheel actuators 90, 92 may be controlled so as to raise the gauge wheels 86, 88 relative to their adjacent frame sections, thereby lowering the front ends of the frame sections to maintain the implement 10 within the desired angular inclination range as the ground-engaging components being to travel up the inclined surface 252.

It should be appreciated that the actuation of the gauge wheels 86, 88 can be controlled in any suitable manner, including closed-loop control and/or open-loop control. For instance, in one embodiment, the vehicle controller 202 may be configured to implement a closed-loop control algorithm in which the gauge wheel position is adjusted based on feedback received from the implement-based level sensor(s) 222. Thus, as the ground-engaging components of the implement 10 contact and begin to travel up the inclined surface 252, the gauge wheel position may be actively adjusted based on the sensor feedback to maintain the inclination angle(s) of the implement 10 within the desired angular inclination range(s).

Moreover, as shown in FIG. 4C, by the time that the work vehicle 14 and the implement 10 have fully transitioned to the inclined surface 252, the hitch 160 and gauge wheels 86, 88 may been returned back to the original positions at which they were located prior to the vehicle 14 beginning to traverse the inclined surface 252. For instance, as indicated above, when the forward-most ground-engaging component initially contacts the inclined surface 252, the hitch position may begin to be adjusted back up towards its original position. Similarly, as the implement 10 begins to transition onto the inclined surface 252, the gauge wheel position may be initially raised to maintain the implement level and may then be subsequently lowered back to its original position as the implement 10 fully transitions to the inclined surface 252.

It should be appreciated that the above-described sequence of operations simply provides one example of suitable control actions that may be performed when a work vehicle 14 and implement 10 are transitioning onto an inclined surface. However, the sequence of operations and/or the specific control actions taken may vary in other scenarios, such as when the inclined surface differs from that shown in FIGS. 4A-4C. For instance, when the work vehicle 10 and implement 14 are transitioning to a downwardly inclined surface, the control actions may differ, at the very least, in the direction of the hitch/wheel position control. Specifically, as the work vehicle 14 initially begins to travel down the inclined surface, the hitch 160 may be raised relative to the surface to maintain the implement 10 within a desired angular inclination range. Thereafter, as the gauge wheels 86, 88 begin to travel down the inclined surface, the hitch 160 may be lowered back towards its initial position while the gauge wheels 86, 88 are simultaneously being lowered to raise the front ends of the frame sections. In such an embodiment, by the time the implement 10 has fully transitioned to the downwardly inclined surface, both the hitch 160 and the gauge wheels 86, 88 may be returned back to their original positions.

It should also be appreciated that the specific sequence of operations and/or control actions taken may vary depending on whether the vehicle/implement 14, 10 are traveling straight up/down the inclined surface as opposed to traveling across the inclined surface at an angle. For instance, if the vehicle/implement 14, 10 are traveling straight up/down the inclined surface, the control actions taken by the vehicle controller 202 may be focused on maintaining the pitch angle(s) of the implement 10 within the corresponding desired pitch angle range(s), such as by adjusting the position of the hitch 160 and/or the gauge wheels 86, 88. However, if the vehicle/implement 14, 10 are traveling up/down the inclined surface at an angle such that the roll angle of the implement 10 will vary as the implement 10 transitions to the inclined surface, the vehicle controller 202 may be configured to execute control actions that take into account the potential for variations in both the pitch angle and the roll angle of the implement 10. For instance, in addition to simply adjusting the position of the hitch 160 and/or the gauge wheels 86, 88 to prevent undesirable changes in the pitch angle of the implement 10, the vehicle controller 202 may also be configured to vary the wheel position control across the differing wing sections. Specifically, as an example, if the vehicle/implement 14, 10 are traveling relative to the inclined surface such that the right-side wing sections 28, 32 will contact the inclined surface prior to the left-side wing sections 30, 34, the vehicle controller 202 may be configured to adjust the position of one or more of the wheels supported on the right-side wing sections 28, 32 in a manner different than the wheels supported on the left-side wing sections 30, 34, such as by actuating one or more wheels supported on the right-side wing sections 28, 32 prior to the wheels supported on the left-side wing sections 30, 34 or by actuating one or more of the wheels supported on the right-side wing sections 28, 32 in a different direction than the wheels supported on the left-side wing sections 30, 34.

Additionally, it should be appreciated that, as the implement 10 begins to travel up/down an inclined surface and subsequently travels across such inclined surface, the controller(s) 202, 204 may also be configured to continuously compare the respective inclination angles of the various frame sections to one another to determine if the angular differential between two or more of the frame sections requires a corrective control action in order to reduce the differential. For instance, as indicated above, the controller(s) 202, 204 may be configured to compare the monitored inclination angle(s) for the center frame section 26 to the monitored inclination angles for the various wing sections 28, 30, 32, 34. In the event that the inclination angle(s) for one or more of the wing sections 28, 30, 32, 34 differs from the inclination angle(s) of the center frame section 26 by a given differential threshold as the implement travels across the inclined surface, the controller(s) 202, 204 may be configured to control the operation of the valve assembly(ies) 216 so as to cause such wing section(s) to be pivoted relative to the center frame section 26 in a manner that reduces the calculated differential.

It should be appreciated that, even though one or more of the various control functions and/or actions disclosed herein are described as being executed by one of the controllers 202, 204 of the system 200, such control functions and/or actions may be executed by either system controller 202, 204 and/or may be distributed across both system controllers 202, 204.

It should also be appreciated that, in addition to using the monitored inclination angle of the work vehicle 14 as feedback for detecting changes in the incline of the surface being traversed by the vehicle 14 (or as an alternative thereto), one or more ground elevation maps may be used to determine and/or anticipate variations or changes in the surface inclination. For instance, a ground elevation map(s) may be stored within the memory of one or both of the system controller(s) 202, 204 that maps the changes in surface inclination across a field(s) being tilled. In such an embodiment, the controller(s) 202, 204 may be communicatively coupled to a positioning device(s) (e.g., a GPS-based device(s)) installed on and/or within the work vehicle 10 and/or the implement 14 for monitoring the current location and heading of the vehicle/implement 14, 10 relative to the ground elevation map(s). As a result, the controller(s) 202, 204 may anticipate when a variation exists in the inclination of the surface across which the work vehicle 10 and/or the implement 14 is about to traverse. Thereafter, the controller(s) 202, 204 may proactively determine the appropriate control action(s) for maintaining the implement 10 at a level orientation as the vehicle 14 and/or implement 10 begins to travel across the location at which the surface inclination varies.

Figure 5:
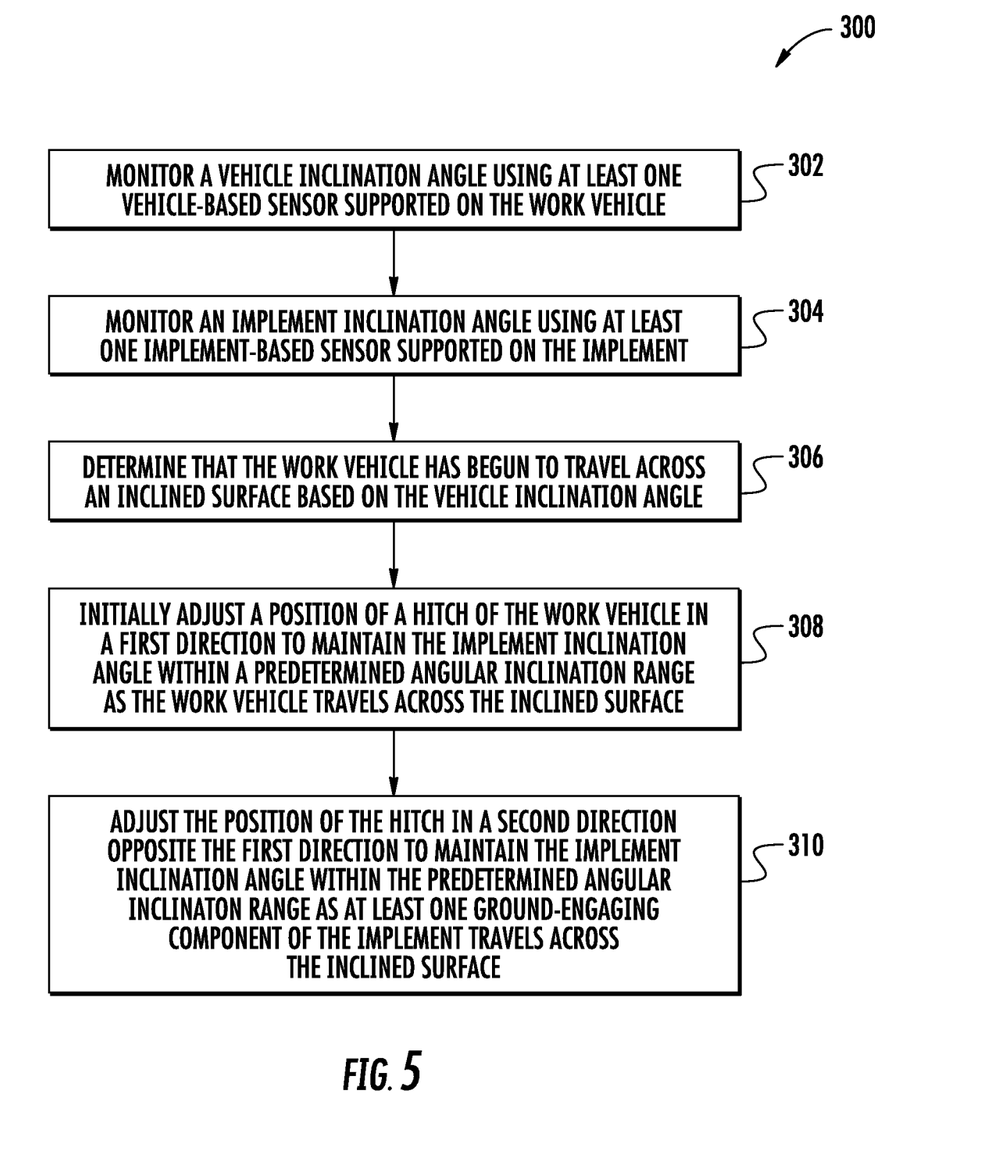
FIG. 5 illustrates a flow diagram of one embodiment of a method for automatically leveling an agricultural implement being towed by a work vehicle in accordance with aspects of the present subject matter.

Referring now to FIG. 5, a flow diagram of one embodiment of a method 300 for automatically leveling an agricultural implement being towed by a work vehicle is illustrated in accordance with aspects of the present subject matter. In general, the method 300 will be described herein with reference to the implement 10 and the work vehicle 14 shown in FIGS. 1 and 2 as well as the system 200 shown in FIG. 3. However, it should be appreciated that the disclosed method 300 may be executed with implements and/or work vehicles having any other suitable configurations and/or with systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (302), the method 300 may include monitoring a vehicle inclination angle using at least one vehicle-based sensor supported on the work vehicle. For example, as indicated above, one or more level sensors 224, such as one or more inclinometers, may be positioned on or within the work vehicle 14 for monitoring the inclination angle(s) of the work vehicle 14. In such an embodiment, the sensor data from the level sensor(s) 224 may be transmitted to one or more of the system controllers 202, 204 for subsequent processing and/or analysis.

Additionally, at (304), the method 300 may include monitoring an implement inclination angle via at least one implement-based sensor supported on the implement. For example, as indicated above, one or more level sensors 222, such as one or more inclinometers, may be positioned on the implement 10 for monitoring the inclination angle(s) of the implement 10. In such an embodiment, the sensor data from the level sensor(s) 222 may be transmitted to one or more of the system controllers 202, 204 for subsequent processing and/or analysis.

Moreover, at (306), the method 300 may include determining that the work vehicle has begun to travel across an inclined surface based on the vehicle inclination angle. Specifically, as indicated above, the sensor data received from the vehicle-based level sensor(s) may be continuously monitored by the system controller(s) 202, 204. As such, by monitoring the sensor data, the controller(s) 202, 204 may detect changes in the inclination angle of the work vehicle 14, thereby allowing the controller(s) 202, 204 to determine when the vehicle 14 begins travel up/down an inclined surface.

Referring still to FIG. 5, at (308), the method 300 may include initially adjusting a position of a hitch of the work vehicle in a first direction to maintain the implement inclination angle within a predetermined angular inclination range as the work vehicle travels across the inclined surface. Specifically, as indicated above, when it is detected that the work vehicle has begun to travel up/down an inclined surface, the controller(s) 202, 204 may be configured to control the operation of the hitch actuators 166 to adjust the position of the hitch 160 (e.g., via closed-loop and/or open-loop control) in a manner that maintains the implement 14 within a desired angular inclination range. For example, when the work vehicle 14 begins to travel across an upwardly inclined surface, the position of the hitch 160 may be adjusted downwardly to maintain the implement 14 within the desired angular inclination range. Similarly, when the work vehicle 14 begins to travel across a downwardly inclined surface, the position of the hitch 160 may be adjusted upwardly to maintain the implement 14 within the desired angular inclination range.

Additionally, at (310), the method 300 may include adjusting the position of the hitch in a second direction opposite the first direction to maintain the implement inclination angle within the predetermined angular inclination range as at least one ground-engaging component of the implement travels across the inclined surface. Specifically, as indicated above, as the implement 10 begins to transition to the inclined surface (e.g., when the forward-most ground-engaging component initially contacts the inclined surface), the position of the hitch 160 may be adjusted back in the opposite direction as the position of the gauge wheels 86, 88 are simultaneously adjusted to maintain the implement within the desired angular inclination range. For example, when the implement 10 begins to travel across an upwardly inclined surface, the position of the hitch 160 may be adjusted upwardly as the gauge wheels 86, 88 are being raised to maintain the implement 14 within the desired angular inclination range. Similarly, when the implement 10 begins to travel across a downwardly inclined surface, the position of the hitch 160 may be adjusted downwardly as the gauge wheels 86, 88 are being lowered to maintain the implement 14 within the desired angular inclination range.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for automatically leveling an agricultural implement being towed by a work vehicle, the method comprising:
    monitoring, with a computing device, a vehicle inclination angle via at least one vehicle-based sensor supported on the work vehicle;
    monitoring, with the computing device, an implement inclination angle via at least one implement-based sensor supported on the implement;
    determining, with the computing device, that the work vehicle has begun to travel across an inclined surface based on the vehicle inclination angle;
    initially adjusting, with the computing device, a position of a hitch of the work vehicle in a first direction to maintain the implement inclination angle within a predetermined angular inclination range as the work vehicle travels across the inclined surface; and
    adjusting, with the computing device, the position of the hitch in a second direction opposite the first direction to maintain the implement inclination angle within the predetermined angular inclination range as at least one ground-engaging component of the implement travels across the inclined surface,
    wherein the at least one controller is further configured to adjust a position of the at least one ground-engaging component relative to at least one frame section of the implement in combination with adjusting the hitch height in the second direction to maintain the implement inclination angle within the predetermined angular levelness range as the at least one ground-engaging component travels across the inclined surface.

2. The method of claim 1, wherein the at least one ground-engaging component comprises at least one gauge wheel of the implement.

3. The method of claim 1, wherein the implement includes a center frame section and at least one wing section pivotally coupled to the center frame section.

4. The method of claim 3, wherein monitoring the implement inclination angle comprises independently monitoring a first inclination angle of the center frame section and a second inclination angle of the at least one wing section.

5. The method of claim 4, further comprising comparing the second inclination angle of the at least one wing section to the first inclination angle of the center frame section as the as at least one ground-engaging component travels across the inclined surface.

6. The method of claim 5, further comprising, when an angular differential between the second inclination angle and the first inclination angle exceeds a differential threshold, pivoting the at least one wing section relative to center frame section to reduce the angular differential.

7. The method of claim 6, wherein the implement comprises at least one wheel supported by the at least one wing section, wherein pivoting the at least one wing section relative to center frame section comprises adjusting a position of the at least one wheel relative to the at least one wing section.

8. The method of claim 1, wherein monitoring the implement inclination angle comprises monitoring both a pitch angle of the implement and a roll angle of the implement.

9. The method of claim 8, further comprising adjusting a position of at least one wheel relative to at least one wing section of the implement in combination with adjusting the hitch height in the second direction with changes in the roll angle as the as at least one ground-engaging component travels across the inclined surface.

10. The method of claim 1, wherein, when the inclined surface corresponds to an upwardly inclined surface, the first direction corresponds to a downward direction towards the inclined surface and the second direction corresponds to an upward direction away from the inclined surface.

11. The method of claim 1, wherein, when the inclined surface corresponds to a downwardly inclined surface, the first direction corresponds to an upward direction away from the inclined surface and the second direction corresponds to a downward direction towards away the inclined surface.

12. The method of claim 1, further comprising monitoring a position of at least one of the work vehicle or the implement relative to the inclined surface using a ground elevation map.

13. A system for automatically leveling an agricultural implement being towed by a work vehicle, the system comprising:
    a vehicle-based sensor configured to detect a vehicle inclination angle of the work vehicle;
    an implement-based sensor configured to detect an implement inclination angle of the implement;
    at least one controller communicatively coupled to the vehicle-based sensor and the implement-based sensor, the at least one controller including a processor and associated memory, the memory storing instructions that, when executed by the processor, configure the at least one controller to:
        monitor the vehicle inclination angle based on sensor data received from the vehicle-based sensor;

monitor the implement inclination angle based on sensor data received from the implement-based sensor;
determine that the work vehicle has begun to travel across an inclined surface based on the vehicle inclination angle;
initially adjust a position of a hitch of the work vehicle in a first direction to maintain the implement inclination angle within a predetermined angular inclination range as the work vehicle travels across the inclined surface; and
adjust the position of the hitch in a second direction opposite the first direction to maintain the implement inclination angle within the predetermined angular inclination range as at least one ground-engaging component of the implement travels across the inclined surface,
wherein the at least one controller is further configured to adjust a position of the at least one ground-engaging component relative to at least one frame section of the implement in combination with adjusting the hitch height in the second direction to maintain the implement inclination angle within the predetermined levelness range as the at least one ground-engaging component travels across the inclined surface.

14. The system of claim 13, wherein the at least one controller is configured to monitor both a pitch angle of the implement and a roll angle of the implement.

15. The system of claim 14, wherein the at least one controller is further configured to adjust a position of at least one wheel relative to at least one wing section of the implement in combination with adjusting the hitch height in the second direction with changes in the roll angle as the as at least one ground-engaging component travels across the inclined surface.

16. A system for automatically leveling an agricultural implement being towed by a work vehicle, the system comprising:
a vehicle-based sensor configured to detect a vehicle inclination angle of the work vehicle;
an implement-based sensor configured to detect an implement inclination angle of the implement;
at least one controller communicatively coupled to the vehicle-based sensor and the implement-based sensor, the at least one controller including a processor and associated memory, the memory storing instructions that, when executed by the processor, configure the at least one controller to:
monitor the vehicle inclination angle based on sensor data received from the vehicle-based sensor;
monitor the implement inclination angle based on sensor data received from the implement-based sensor;
determine that the work vehicle has begun to travel across an inclined surface based on the vehicle inclination angle;
initially adjust a position of a hitch of the work vehicle in a first direction to maintain the implement inclination angle within a predetermined angular inclination range as the work vehicle travels across the inclined surface; and
adjust the position of the hitch in a second direction opposite the first direction to maintain the implement inclination angle within the predetermined angular inclination range as at least one ground-engaging component of the implement travels across the inclined surface,
wherein the implement includes a center frame section and at least one wing section pivotally coupled to the center frame section, the least one controller being configured to independently monitor a first inclination angle of the center frame section and a second inclination angle of the at least one wing section.

17. The system of claim 16, wherein the at least one controller is further configured to compare second inclination angle of the at least one wing section to the first inclination angle of the center frame section as the as at least one ground-engaging component travels across the inclined surface.

18. The system of claim 17, wherein, when an angular differential between the second inclination angle and the first inclination angle exceeds a differential threshold, the at least one controller is configured to pivot the at least one wing section relative to center frame section to reduce the angular differential.

* * * * *